(12) United States Patent
Guo et al.

(10) Patent No.: US 7,724,975 B2
(45) Date of Patent: May 25, 2010

(54) DESIGN TECHNIQUES AND THEIR CIRCUIT DESIGNS FOR VERSATILE AND SCALABLE VIDEO CODING

(75) Inventors: Jiun-In Guo, Minxiong Shiang (TW); Kuan-Hung Chen, Dalin Town (TW); Jinn-Shyan Wang, Lucuo Village (TW)

(73) Assignee: National Chun Cheng University, Chia-Yi (TW)

( * ) Notice: Subject to any disclaimer, the term of this patent is extended or adjusted under 35 U.S.C. 154(b) by 997 days.

(21) Appl. No.: 11/472,344

(22) Filed: Jun. 22, 2006

(65) Prior Publication Data
US 2007/0297500 A1    Dec. 27, 2007

(51) Int. Cl.
*G06K 9/36* (2006.01)
(52) U.S. Cl. .................................... 382/248
(58) Field of Classification Search ............. 382/248, 382/250; 348/395.1, 403.1, 404.1, 408.1, 348/420.1, 424.2; 375/240.01, 240.02, 240.18, 375/240.19, 240.2, 240.24, 240.25, 240.26; 708/400, 401, 402
See application file for complete search history.

(56) References Cited

U.S. PATENT DOCUMENTS

| | | | | |
|---|---|---|---|---|
| 6,574,648 | B1 * | 6/2003 | Oohashi et al. | 708/402 |
| 6,785,700 | B2 * | 8/2004 | Masud et al. | 708/400 |
| 6,976,046 | B2 * | 12/2005 | Guevorkian et al. | 708/400 |
| 7,035,332 | B2 * | 4/2006 | He et al. | 375/240.02 |

OTHER PUBLICATIONS

Chang, Tian-Sheuan et al., "A Simple Processor Core Design for DCT/ICT", IEEE Transactions On Circuits And Systems For Video Technology, vol. 10, No. 3, pp. 439-447, Apr. 2000.*
Kuan-Hung Chen, et al., "An Efficient Spurious Power Suppression Technique (SPST) and Its Applications on MPEG-4 AVC/H.264 Transform Coding Design", ISLPED '05, Aug. 8-10, 2005, pp. 155-160.
Kuan-Hung Chen, et al., "Design Exploration of a Spurious Power Suppression Technique (SPST) and Its Applications", A-SSCC 2005 Proceedings of Technical Papers, Nov. 1-3, 2005, pp. 341-344.

* cited by examiner

*Primary Examiner*—Jose L Couso
(74) *Attorney, Agent, or Firm*—Rosenberg, Klein & Lee

(57) ABSTRACT

Design techniques and their circuit designs for versatile and scalable video coding are proposed, in which the inner product operation in the transform coding expression is taken apart into a series of add and shift operations, and the expression is partitioned into several sub-expressions. Taking each order of the add-and-shift series as a clock period, several adders/subtractors and a shift accumulator are used to carry out corresponding additions/subtractions and shift operations to finish the inner product operations. The calculating result is accumulated until all the orders are finished. The final accumulated value is the output of the transform coding. Data throughput rate can thus be enhanced to save the power consumption of the circuit system. Moreover, a dynamic guarded computation method and a switching power suppression technique are provided to further lower the power consumption.

41 Claims, 13 Drawing Sheets

DESIGN TECHNIQUES AND THEIR CIRCUIT DESIGNS FOR VERSATILE AND SCALABLE VIDEO CODING

BACKGROUND OF THE INVENTION

1. Field of the Invention

The present invention relates to a video coding circuit system and its algorithm and, more particularly, to versatile and scalable video coding techniques and their circuit system.

2. Description of Related Art

Common multimedia video CODECs including video compression standards such as JPEG, MPEG, and H.264 have similar coding procedures. After the image slicing and the color mode transform and sampling, the original space domain data is transformed to the frequency domain data through transform coding. After that, the quantization and the VLC coding are performed before storage. In order to achieve realtime video coding requirements, transform coding is one of the key modules in multimedia CODECs. Consequently, how to design a high performance, low power and low cost transform coding hardware implementation is always an important research topic in this domain.

Transform coding includes the discrete cosine transform (DCT) adopted by the JPEG/MPEG system, the integer transform and the Hadamard transform adopted by H.264 system. The conventional transform coding circuit design is described below. Exemplified with the DCT that has the most complicated computation and is most widespread, a 2D N×N DCT expression is shown as follows:

$$X(u, v) = \frac{2}{N} C(u)C(v) \sum_{i=0}^{N-1} \sum_{j=0}^{N-1} x(i, j) \cos\left(\frac{(2i+1)u\pi}{2N}\right) \cos\left(\frac{(2j+1)v\pi}{2N}\right) \quad (1)$$

where $x(i, j)$ is the input data, $X(u, v)$ is the output result, $C(m)$ is $1/\sqrt{2}$ when $m=0$, and is 1 elsewhere. From Eq. (1), we know that the computational complexity of the 2D N×N DCT is $N^4$ multiplication/addition operations. For an embedded system of a portable electronic product, this computational complexity greatly exceeds its capability. In order to solve this problem, hardware accelerators based on fast algorithms are usually adopted. For instance, in "A Simple Processor Core Design for DCT/ICT" disclosed in IEEE Trans. CSVT., vol. 10, no. 3, pp. 439-447, April 2000, the technique of adder-based distributed arithmetic is used to take apart the inner product operation in the DCT into continuous bit-level add and shift operations. Because the operations of those bits of value "0" can be omitted, the speed of the DCT can be enhanced. The principle can be seen in Eq. (2):

$$Yn = \sum_{i=0}^{N-1} C_i \cdot X_i = \sum_{i=0}^{N-1} \left( \sum_{k=0}^{Wc-1} C_{i,k} \cdot 2^{-k} \right) \cdot X_i = \sum_{k=0}^{Wc-1} \left( \sum_{i=0}^{N-1} C_{i,k} \cdot X_i \right) \cdot 2^{-k} \quad (2)$$

where N is the order of the inner product operation, $X_i$ is the input data, $C_i$ is the constant coefficient, $W_c$ is the word length of $C_i$, $C_{i,k}$ is the k-th bit value of $C_i$ which is either "0" or "1", and $Y_n$ is the output result. With Eq. (2) expressed by the canonical signed digit (CSD) representation, a 1D 8-point DCT can be represented by the table shown in FIG. 1. In the table, common terms shown with gray shade are calculated out beforehand (non-common terms are shown with slash lines), and are stored in registers for subsequent use. FIG. 2 shows the circuits that realizes the add and shift operations. Input data and common terms are stored in a register 10, the output of an adder/subtractor 20 is the primary output of the circuit system. That is, the value of a first register 14 right-shifted by a shifter 18 adds/subtracts the value of a second register 16. The input sources of the registers 14 and 16 can be selected between the adder/subtractor 20 or the register 10 by a multiplexer 12.

Although the conventional video coding method and circuit system shown in FIGS. 1 and 2 can achieve low cost and high hardware utility efficiency, it has a big drawback in power consumption. Because it requires a large amount of access of the register 10 to finish all the operations in FIG. 1, the data throughput rate is too low which induces that higher operation frequencies are required to meet the realtime requirements. Higher execution frequencies will lead to linear growth of the power consumption, hence being not able to meet the design specification of low power consumption. If one wants to use several circuit systems for parallel processing to enhance the data throughput rate, the bandwidth requirement of memory and the amount of internal registers will increase therewith, making the realization of the whole circuit system more difficult.

The present invention aims to provide high efficiency, low cost and low power video coding methods and their circuit designs to solve the above problems in the prior art.

SUMMARY OF THE INVENTION

To achieve these and other advantages and in order to overcome the disadvantages of the conventional method in accordance with the purposes of the invention as embodied and broadly described herein, the present invention provides high efficiency, low power video coding methods and their circuit systems to reduce the computation time and the power consumption by enhancing the data throughput rate.

An object of the present invention is to provide a low cost video coding method and the circuit system. Because the number of register for storing common terms is reduced, the circuit area decreases and the required hardware cost becomes lower.

An object of the present invention is to provide a video coding circuit system that is expandable and is scalable in the size of architecture. The video coding circuit system can use several parallel circuits to carry out the transform according to the requirement of performance. Moreover, it is not necessary to extra increase the amount of I/O registers for connection with the system.

An object of the present invention is to provide a dynamic guarded computation method, in which the statistics of the switching activity of the data is first gathered, and a detection logic circuit is used to calculate the least number of bits that are required. The part of circuit not affecting the operation result is turned off according to the detection result to further effectively save the overall power consumption.

An object of the present invention is to provide a switching power suppression technique, in which the time when the input data enter the arithmetic circuit is controlled to let the input data enter the arithmetic circuit after they become stable so as to avoid the switching power consumption caused by transient state.

To achieve the above objects, a transform coding circuit system of the present invention comprises at least an adder/subtractor and a shift register connected to one of the adder/subtractor. The coefficients of the transform coding expression are expressed with a digit system, and the inner product operation is taken apart into a series of add and shift operations. After the expression is partitioned into several sub-expressions, several adders/subtractors and a shift accumulator are used to carry out the additions/subtractions and shift operations corresponding to each sub-expression. The operation result of each time is accumulated until the operations of all the orders are finished. The final accumulated value is the output of the transform coding.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principle of the invention. In the drawing.

DETAILED DESCRIPTION OF THE PREFERRED EMBODIMENTS

Figure 1:
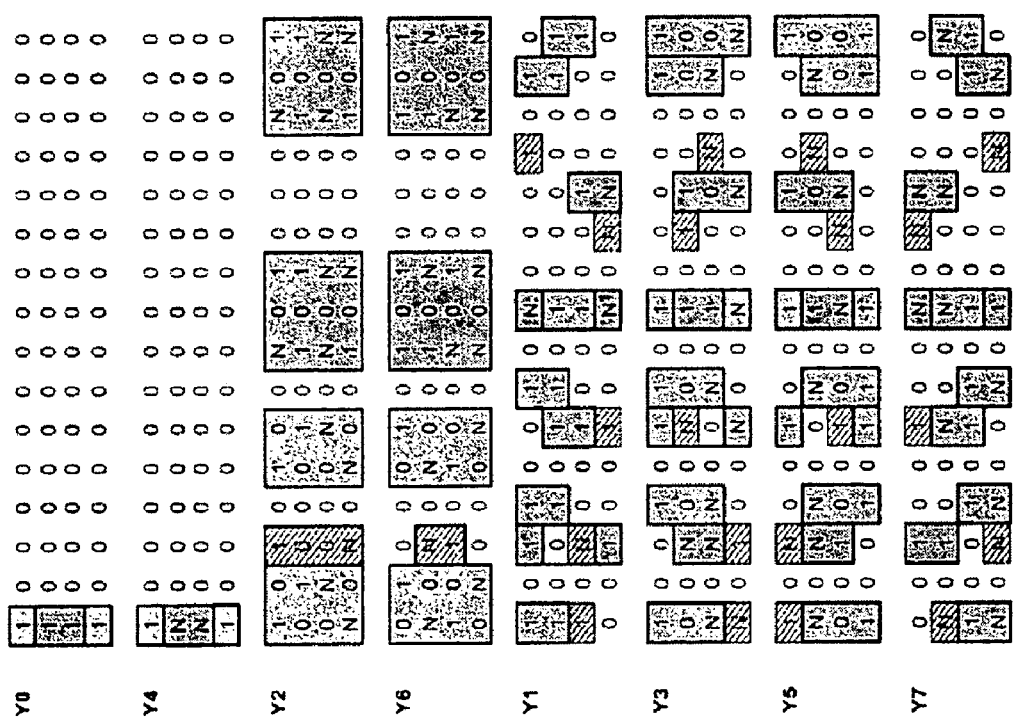
FIG. 1 is a diagram showing how to use the add and shift operations to represent a 1D 8-point discrete cosine transform in the prior art.
Figure 2:
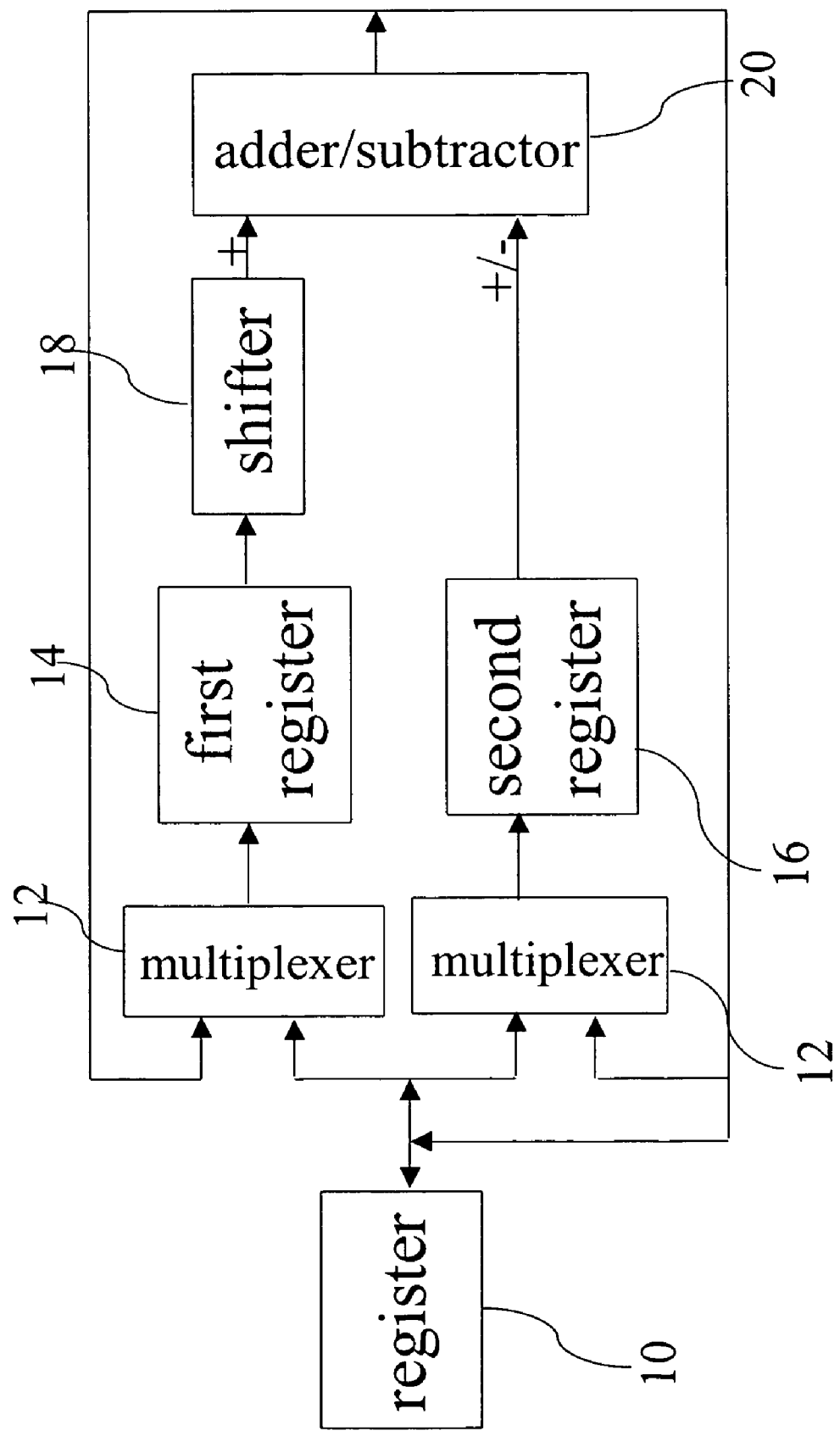
FIG. 2 is a diagram of a conventional transform coding circuit system.

Reference will now be made in detail to the preferred embodiments of the present invention, examples of which are illustrated in the accompanying drawings. Whenever possible, the same reference numbers are used in the drawings and the description to refer to the same or like parts.

The present invention provides a high efficiency, low cost and low power video coding method and the corresponding circuit system to solve the problem of increasing the power consumption due to a too low data throughput rate in the prior art. The transform coding includes the DCT adopted by JPEG/MPEG systems, the integer transform and the Hadamard transform adopted by H.264 systems, which can be a 1D or 2D expression. The present invention can be applied to multimedia video coding standards such as JPEG, MPEG1, MPEG2, MPEG4, H.261, H.263 and H.264.

The present invention is characterized in that it is not necessary to temporarily store some intermediate values and repetitively access the data registers, which is achieved by properly adopting several circuit systems in parallel to speed up the video coding. First, coefficients of the transform coding expression used by video coding are expressed by a digit system such as a binary digit system. Moreover, the coefficients can be expressed with the canonical signed digit representation and multiplied by $\sqrt{2}$ to reduce the amount of calculation. Because the effect of multiplying the coefficients by $\sqrt{2}$ is equivalent to multiplying the output of the 2D transform coding by 2, it can be easily restored with a right shift operation which implies a division by 2. Next, the inner product operation in the transform coding expression is taken apart into a series of add and shift operations by an adder-based distributed arithmetic algorithm which is shown in Eq. (2). It is also assumed that $\{S1, S2, S3, S4, S5, S6, S7, S8\}=\{X0+X7, X1+X6, X2+X5, X3+X4, X0-X7, X1-X6, X2-X5, X3-X4\}$. The simplified computations based on the example of a 1D 8-point DCT are shown in Table 1. The meaning is illustrated below with Y0 and Y2:

$$Y0=(S1+S2+S3+S4)2^{-1};$$

$$Y2=(S1-S4)2^{-1}+(S2-S3)2^{-2}+(S1-S4)2^{-3}+(S1-S4)2^{-5}+(S2-S3)2^{-6}+(-S1+S2-S3+S4)2^{-8}+(S1+S2-S3-S4)2^{-10}+(-S1+S2-S3+S4)2^{-14}+(S1+S2-S3-S4)2^{-6};$$

The meaning in Table 1 is:

$$Y0=(S1+S2+S3+S4)>>1;$$

$$Y2=(S1-S4)>>1+(S2-S3)>>2+(S1-S4)>>3+(S1-S4)>>5+(S2-S3)>>6+(-S1+S2-S3+S4)>>8+(S1+S2-S3-S4)>>10+(-S1+S2-S3+S4)>>14+(S1+S2-S3-S4)>>16;$$

where ">>s" means a right shift operation by s bits.

TABLE 1

| Output | $2^{-1}$ | $2^{-2}$ | $2^{-3}$ | $2^{-4}$ | $2^{-5}$ | $2^{-6}$ | $2^{-7}$ | $2^{-8}$ | $2^{-9}$ | $2^{-10}$ | $2^{-11}$ | $2^{-12}$ | $2^{-13}$ | $2^{-14}$ | $2^{-15}$ | $2^{-16}$ | Input |
|---|---|---|---|---|---|---|---|---|---|---|---|---|---|---|---|---|---|
| Y0 | 1 | 0 | 0 | 0 | 0 | 0 | 0 | 0 | 0 | 0 | 0 | 0 | 0 | 0 | 0 | 0 | S1 |
|  | 1 | 0 | 0 | 0 | 0 | 0 | 0 | 0 | 0 | 0 | 0 | 0 | 0 | 0 | 0 | 0 | S2 |
|  | 1 | 0 | 0 | 0 | 0 | 0 | 0 | 0 | 0 | 0 | 0 | 0 | 0 | 0 | 0 | 0 | S3 |
|  | 1 | 0 | 0 | 0 | 0 | 0 | 0 | 0 | 0 | 0 | 0 | 0 | 0 | 0 | 0 | 0 | S4 |
| Y2 | 1 | 0 | 1 | 0 | 1 | 0 | 0 | N | 0 | 1 | 0 | 0 | 0 | N | 0 | 1 | S1 |
|  | 0 | 1 | 0 | 0 | 0 | 1 | 0 | 1 | 0 | 1 | 0 | 0 | 0 | 1 | 0 | 1 | S2 |
|  | 0 | N | 0 | 0 | 0 | N | 0 | N | 0 | N | 0 | 0 | 0 | N | 0 | N | S3 |
|  | N | 0 | N | 0 | N | 0 | 0 | 1 | 0 | N | 0 | 0 | 0 | 1 | 0 | N | S4 |

TABLE 1-continued

| Output | $2^{-1}$ | $2^{-2}$ | $2^{-3}$ | $2^{-4}$ | $2^{-5}$ | $2^{-6}$ | $2^{-7}$ | $2^{-8}$ | $2^{-9}$ | $2^{-10}$ | $2^{-11}$ | $2^{-12}$ | $2^{-13}$ | $2^{-14}$ | $2^{-15}$ | $2^{-16}$ | Input |
|---|---|---|---|---|---|---|---|---|---|---|---|---|---|---|---|---|---|
| Y4 | 1 | 0 | 0 | 0 | 0 | 0 | 0 | 0 | 0 | 0 | 0 | 0 | 0 | 0 | 0 | 0 | S1 |
|  | N | 0 | 0 | 0 | 0 | 0 | 0 | 0 | 0 | 0 | 0 | 0 | 0 | 0 | 0 | 0 | S2 |
|  | N | 0 | 0 | 0 | 0 | 0 | 0 | 0 | 0 | 0 | 0 | 0 | 0 | 0 | 0 | 0 | S3 |
|  | 1 | 0 | 0 | 0 | 0 | 0 | 0 | 0 | 0 | 0 | 0 | 0 | 0 | 0 | 0 | 0 | S4 |
| Y6 | 0 | 1 | 0 | 0 | 0 | 1 | 0 | 1 | 0 | 1 | 0 | 0 | 0 | 1 | 0 | 1 | S1 |
|  | N | 0 | N | 0 | N | 0 | 0 | 1 | 0 | N | 0 | 0 | 0 | 1 | 0 | N | S2 |
|  | 1 | 0 | 1 | 0 | 1 | 0 | 0 | N | 0 | 1 | 0 | 0 | 0 | N | 0 | 1 | S3 |
|  | 0 | N | 0 | 0 | 0 | N | 0 | N | 0 | N | 0 | 0 | 0 | N | 0 | N | S4 |
| Y1 | 1 | 0 | 1 | 1 | 0 | 0 | 1 | 0 | N | 0 | 0 | 0 | 1 | 0 | 1 | 0 | S5 |
|  | 1 | 0 | 0 | 1 | 0 | 1 | 1 | 0 | 1 | 0 | 0 | 0 | 0 | 1 | 1 | 1 | S6 |
|  | 1 | 0 | N | 0 | 0 | 1 | 0 | 0 | 1 | 0 | 0 | 1 | 0 | 0 | 0 | 1 | S7 |
|  | 0 | 0 | 1 | 0 | 0 | 1 | 0 | 0 | N | 0 | N | N | 0 | 0 | 0 | 0 | S8 |
| Y3 | 1 | 0 | 0 | 1 | 0 | 1 | 1 | 0 | 1 | 0 | 0 | 0 | 0 | 0 | 1 | 1 | S5 |
|  | 0 | 0 | N | 0 | 0 | N | 0 | 0 | 1 | 0 | 1 | 1 | 0 | 0 | 0 | 0 | S6 |
|  | N | 0 | N | N | 0 | 0 | N | 0 | 1 | 0 | 0 | 0 | N | 0 | N | 0 | S7 |
|  | N | 0 | 1 | 0 | 0 | N | 0 | 0 | N | 0 | 0 | N | 0 | 0 | 0 | N | S8 |
| Y5 | 1 | 0 | N | 0 | 0 | 1 | 0 | 0 | 1 | 0 | 0 | 1 | 0 | 0 | 0 | 1 | S5 |
|  | N | 0 | N | N | 0 | 0 | N | 0 | 1 | 0 | 0 | N | 0 | N | 0 | 0 | S6 |
|  | 0 | 0 | 1 | 0 | 0 | 1 | 0 | 0 | N | 0 | N | N | 0 | 0 | 0 | 0 | S7 |
|  | 1 | 0 | 0 | 1 | 0 | 1 | 1 | 0 | 1 | 0 | 0 | 0 | 0 | 0 | 1 | 1 | S8 |
| Y7 | 0 | 0 | 1 | 0 | 0 | 1 | 0 | 0 | N | 0 | N | N | 0 | 0 | 0 | 0 | S5 |
|  | N | 0 | 1 | 0 | 0 | N | 0 | 0 | N | 0 | 0 | N | 0 | 0 | 0 | N | S6 |
|  | 1 | 0 | 0 | 1 | 0 | 1 | 1 | 0 | 1 | 0 | 0 | 0 | 0 | 0 | 1 | 1 | S7 |
|  | N | 0 | N | N | 0 | 0 | N | 0 | 1 | 0 | 0 | 0 | N | 0 | N | 0 | S8 |

Figure 3:
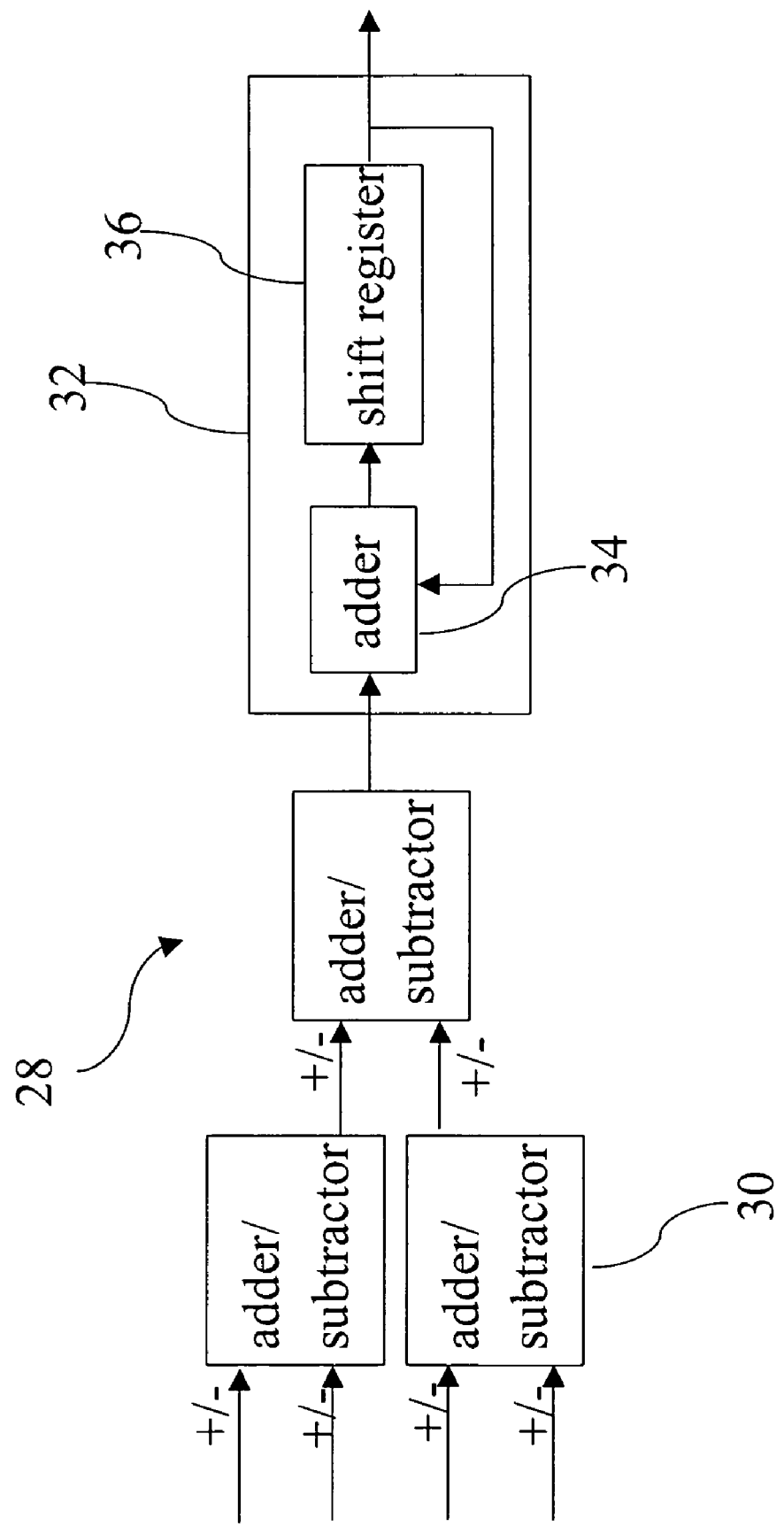
FIG. 3 is a diagram of a video coding circuit system according to an embodiment of the present invention.

The above additions/subtractions and shift operations can be realized with a circuit system 28 composed of the adder/subtractors and the shift accumulator shown in FIG. 3. Taking each order as a clock period, the input data is input to a shift accumulator 32 having an adder 34 for carrying out the shift operation after the additions/subtractions performed by several adder/subtractors 30. The result is temporarily stored in a shift register 36. The operation of the next order is then performed until all the orders have been finished. The operation result of each order is accumulated to obtain the output data. The shift accumulator 32 includes two parts: the adder 34 and the shift register 36. The adder 34 is responsible for the action of accumulating the operation result. The shift register 36 is connected to the adder 34, and performs the shift operation and temporarily stores the operation result.

Figure 4:
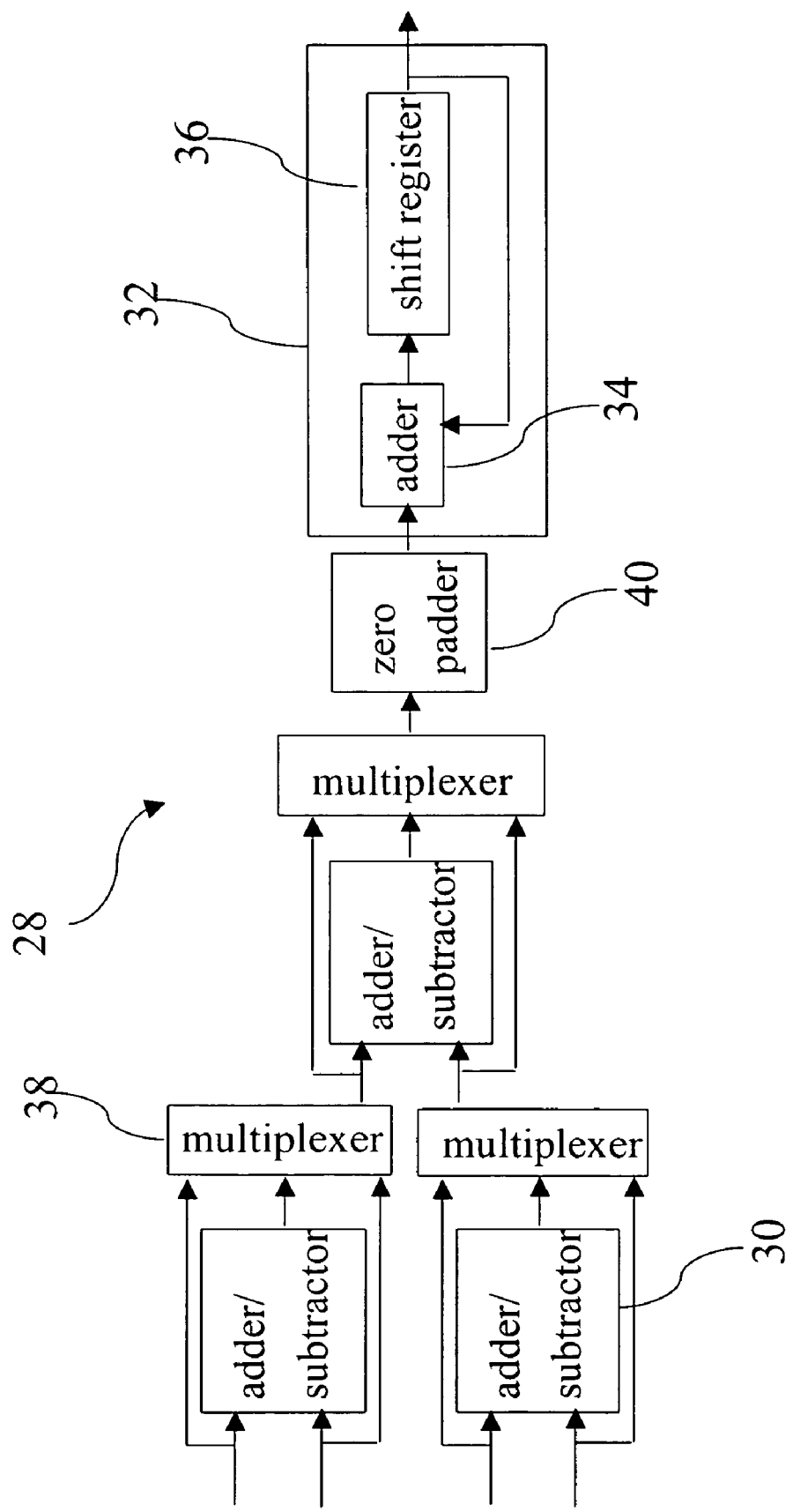
FIG. 4 is a diagram of a video coding circuit system according to another embodiment of the present invention.

As shown in FIG. 4, a zero padder 40 can be used to perform a zero padding procedure, padding zeros to binary fraction parts of the data input to the shift accumulator 32 before the input data enter the shift accumulator 32, thereby compensating the accuracy loss caused by the shift operation of the shift accumulator 32. Several multiplexers 38 having a plurality of inputs and at least an output are used to select one of the inputs to the adder/subtractors 30 which are connected to their outputs so as to separately enable each item of the input data and make the whole operation process more flexible.

In order to enhance the data throughput rate of coding, the transform coding expression can be partitioned into several sub-expressions according to its computational complexity. The object of partition is to process the sub-expressions in parallel so as to speed up the operation of transform coding. The amount of computations in terms of clock periods of each sub-expression should be arranged as close as possible when performing the partition. Table 2 shows an embodiment of the partition. In Table 2, the partitioning action is depicted with a dashed line.

TABLE 2

| Output | $2^{-1}$ | $2^{-2}$ | $2^{-3}$ | $2^{-4}$ | $2^{-5}$ | $2^{-6}$ | $2^{-7}$ | $2^{-8}$ | $2^{-9}$ | $2^{-10}$ | $2^{-11}$ | $2^{-12}$ | $2^{-13}$ | $2^{-14}$ | $2^{-15}$ | $2^{-16}$ | Input |
|---|---|---|---|---|---|---|---|---|---|---|---|---|---|---|---|---|---|
| Y0 | 1 | 0 | 0 | 0 | 0 | 0 | 0 | 0 | 0 | 0 | 0 | 0 | 0 | 0 | 0 | 0 | S1 |
|  | 1 | 0 | 0 | 0 | 0 | 0 | 0 | 0 | 0 | 0 | 0 | 0 | 0 | 0 | 0 | 0 | S2 |
|  | 1 | 0 | 0 | 0 | 0 | 0 | 0 | 0 | 0 | 0 | 0 | 0 | 0 | 0 | 0 | 0 | S3 |
|  | 1 | 0 | 0 | 0 | 0 | 0 | 0 | 0 | 0 | 0 | 0 | 0 | 0 | 0 | 0 | 0 | S4 |
| Y2 | 1 | 0 | 1 | 0 | 1 | 0 | 0 | N | 0 | 1 | 0 | 0 | 0 | N | 0 | 1 | S1 |
|  | 0 | 1 | 0 | 0 | 0 | 1 | 0 | 1 | 0 | 1 | 0 | 0 | 1 | 0 | 1 | 1 | S2 |
|  | 0 | N | 0 | 0 | 0 | N | 0 | N | 0 | N | 0 | 0 | 0 | N | 0 | N | S3 |
|  | N | 0 | N | 0 | N | 0 | 0 | 1 | 0 | N | 0 | 0 | 0 | 1 | 0 | N | S4 |
| Y4 | 1 | 0 | 0 | 0 | 0 | 0 | 0 | 0 | 0 | 0 | 0 | 0 | 0 | 0 | 0 | 0 | S1 |
|  | N | 0 | 0 | 0 | 0 | 0 | 0 | 0 | 0 | 0 | 0 | 0 | 0 | 0 | 0 | 0 | S2 |
|  | N | 0 | 0 | 0 | 0 | 0 | 0 | 0 | 0 | 0 | 0 | 0 | 0 | 0 | 0 | 0 | S3 |
|  | 1 | 0 | 0 | 0 | 0 | 0 | 0 | 0 | 0 | 0 | 0 | 0 | 0 | 0 | 0 | 0 | S4 |
| Y6 | 0 | 1 | 0 | 0 | 0 | 1 | 0 | 1 | 0 | 1 | 0 | 0 | 0 | 1 | 0 | 1 | S1 |
|  | N | 0 | N | 0 | N | 0 | 0 | 1 | 0 | N | 0 | 0 | 0 | 1 | 0 | N | S2 |
|  | 1 | 0 | 1 | 0 | 1 | 0 | 0 | N | 0 | 1 | 0 | 0 | 0 | N | 0 | 1 | S3 |
|  | 0 | N | 0 | 0 | 0 | N | 0 | N | 0 | N | 0 | 0 | 0 | N | 0 | N | S4 |
| Y1 | 1 | 0 | 1 | 1 | 0 | 0 | 1 | 0 | N | 0 | 0 | 0 | 1 | 0 | 1 | 0 | S5 |
|  | 1 | 0 | 0 | 1 | 0 | 1 | 1 | 0 | 1 | 0 | 0 | 0 | 0 | 1 | 1 | 1 | S6 |
|  | 1 | 0 | N | 0 | 0 | 1 | 0 | 0 | 1 | 0 | 0 | 1 | 0 | 0 | 0 | 1 | S7 |
|  | 0 | 0 | 1 | 0 | 0 | 1 | 0 | 0 | N | 0 | N | N | 0 | 0 | 0 | 0 | S8 |

TABLE 2-continued

| Output | $2^{-1}$ | $2^{-2}$ | $2^{-3}$ | $2^{-4}$ | $2^{-5}$ | $2^{-6}$ | $2^{-7}$ | $2^{-8}$ | $2^{-9}$ | $2^{-10}$ | $2^{-11}$ | $2^{-12}$ | $2^{-13}$ | $2^{-14}$ | $2^{-15}$ | $2^{-16}$ | Input |
|---|---|---|---|---|---|---|---|---|---|---|---|---|---|---|---|---|---|
| Y3 | 1 | 0 | 0 | 1 | 0 | 1 | 1 | 0 | 1 | 0 | 0 | 0 | 0 | 0 | 1 | 1 | S5 |
|  | 0 | 0 | N | 0 | 0 | N | 0 | 0 | 1 | 0 | 1 | 1 | 0 | 0 | 0 | 0 | S6 |
|  | N | 0 | N | N | 0 | 0 | N | 0 | 1 | 0 | 0 | 0 | N | 0 | N | 0 | S7 |
|  | N | 0 | 1 | 0 | 0 | N | 0 | 0 | N | 0 | 0 | N | 0 | 0 | 0 | N | S8 |
| Y5 | 1 | 0 | N | 0 | 0 | 1 | 0 | 0 | 1 | 0 | 0 | 1 | 0 | 0 | 0 | 1 | S5 |
|  | N | 0 | N | N | 0 | 0 | N | 0 | 1 | 0 | 0 | 0 | N | 0 | N | 0 | S6 |
|  | 0 | 0 | 1 | 0 | 0 | 1 | 0 | 0 | N | 0 | N | N | 0 | 0 | 0 | 0 | S7 |
|  | 1 | 0 | 0 | 1 | 0 | 1 | 1 | 0 | 1 | 0 | 0 | 0 | 0 | 0 | 1 | 1 | S8 |
| Y7 | 0 | 0 | 1 | 0 | 0 | 1 | 0 | 0 | N | 0 | N | N | 0 | 0 | 0 | 0 | S5 |
|  | N | 0 | 1 | 0 | 0 | N | 0 | 0 | N | 0 | 0 | N | 0 | 0 | 0 | N | S6 |
|  | 1 | 0 | 0 | 1 | 0 | 1 | 1 | 0 | 1 | 0 | 0 | 0 | 0 | 0 | 1 | 1 | S7 |
|  | N | 0 | N | N | 0 | 0 | N | 0 | 1 | 0 | 0 | 0 | N | 0 | N | 0 | S8 |

Figure 5:
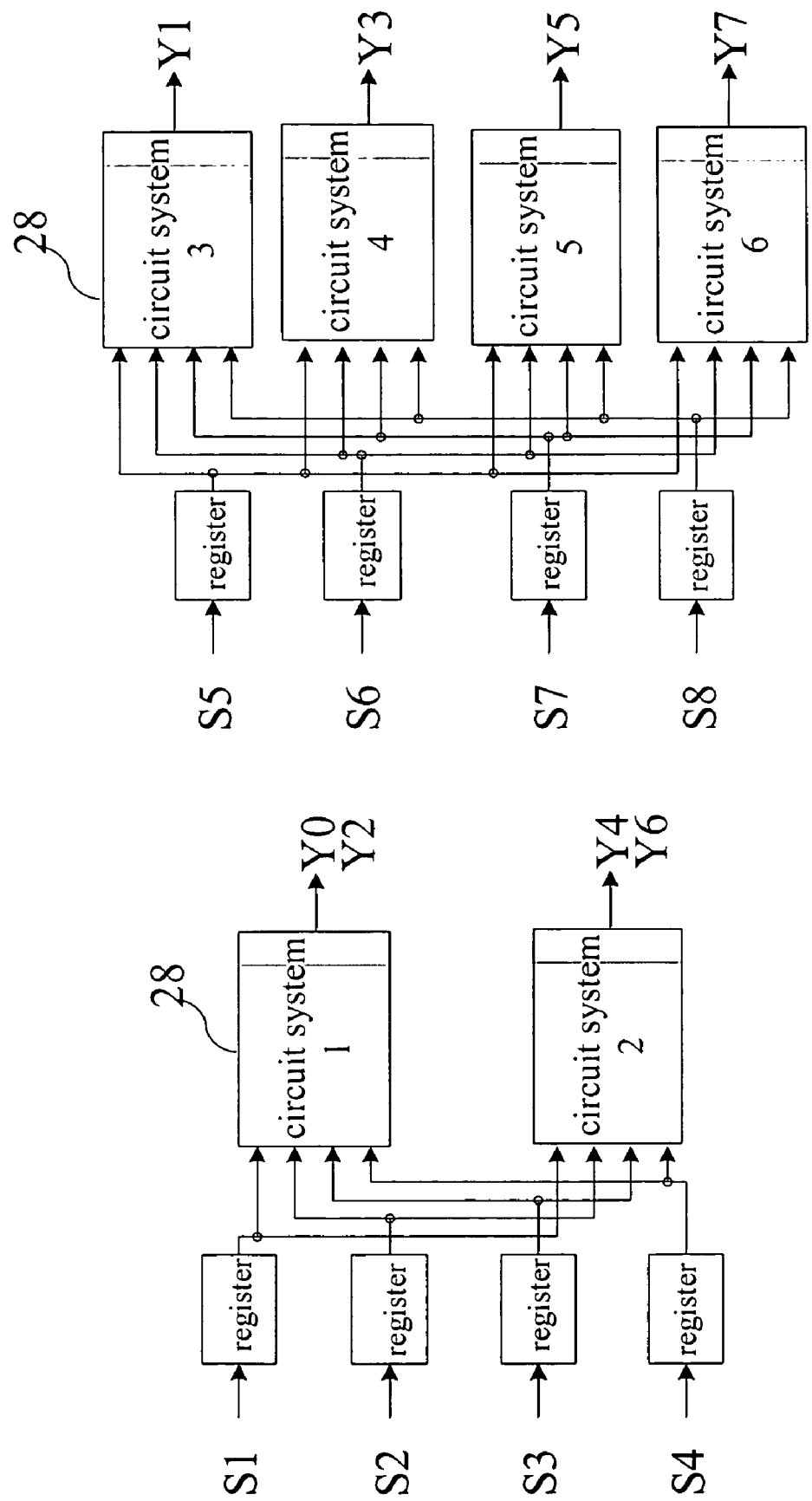
FIG. 5 is a diagram of the parallel architecture of a video coding circuit system according to an embodiment of the present invention.

Because Y0 and Y4 need 1 clock period, Y2 and Y6 need 9 clock periods, and Y1, Y3, Y5 and Y7 need 11 clock periods of calculation time, Y0 and Y2 are partitioned as a sub-expression, Y4 and Y6 are partitioned as a sub-expression, and each of Y1, Y3, Y5, Y7 is partitioned as a sub-expression. As shown in FIG. 5, a circuit system 28 is used to calculate Y0 and Y2, another circuit system 28 calculates Y4 and Y6 in parallel, and four other circuit systems 28 calculate Y1, Y3, Y5, Y7 in parallel, respectively. A register (not shown) at the output end of the circuit system is used to collect the output data of the sub-expressions. In this way, the finish time of the 8-point DCT operation can be shortened to 11 clock periods. Therefore, only 88 calculation periods are required to finish the 1D 8-point DCT operation. Moreover, input data of different orders can first be shifted to the same order for combined operation to further save the computation time. After conversion, 4CIF (704×576, 4:2:0, 30 fps) can be achieved at 18.25 MHZ, or 720 p HD (1280×720, 4:2:0, 30 fps) can be achieved at 41.48 MHz. Besides, the computations of Y0, Y2, Y4 and Y6 can be finished by using four circuit systems 28, and the computations of Y1, Y3, Y5 and Y7 can be finished by using eight circuit systems 28, as shown in Table 3. This embodiment of partition can achieve 1080i HD (1920×1088, 4:2:0, 30 fps) at 47.10 MHz digital cinema (4096×2048, 4:2:0, 30 fps) at 188.75 MHz for high image quality applications. As can be seen from Table 3, the thinner each partition of the expression is, the higher the data throughput rate is. Moreover, the amount of registers required for external connection with the system will not increase. In architectural view point, several circuits can be used in parallel as piling bricks according to the requirement of performance to finish the transform. Therefore, the present invention is highly flexible and scalable in use.

TABLE 3

| Sub-expression | | Description | # of Clock Periods | Application |
|---|---|---|---|---|
| 1 | 1 | {Y0, Y2, Y4, Y6} | 16 | CIF(352 × 288, 4:2:0, 30 fps) @ 9.13 MHz |
|  | 2 | {Y1, Y3} | 14 |  |
|  | 3 | {Y5, Y7} | 14 |  |
| 2 | 1 | {Y0, Y2} | 8 | 4CIF(704 × 576, 4:2:0, 30 fps) @ 18.25 MHz or 720p HD(1280 × 720, 4:2:0, 30 fps) @ 41.48 MHz |
|  | 2 | {Y4, Y6} | 8 |  |
|  | 3 | Y1 | 7 |  |
|  | 4 | Y3 | 7 |  |
|  | 5 | Y5 | 7 |  |
|  | 6 | Y7 | 7 |  |
| 3 | 1 | Y0 + Y2 ($2^{-1}$~$2^{-5}$) | 4 | 1080i HD (1920 × 1088, 4:2:0, 30 fps) @ 47.10 MHz or |
|  | 2 | Y2 ($2^{-6}$~$2^{-16}$) | 4 |  |
|  | 3 | Y4 + Y6 ($2^{-1}$~$2^{-5}$) | 4 |  |
|  | 4 | Y6 ($2^{-1}$~$2^{-5}$) | 4 |  |
|  | 5 | Y1($2^{-1}$~$2^{-7}$) | 4 | digital cinema (4096 × 2048, 4:2:0, 30 fps)@188.75 MHz |
|  | 6 | Y1($2^{-9}$~$2^{-16}$) | 3 |  |
|  | 7 | Y3($2^{-1}$~$2^{-7}$) | 4 |  |
|  | 8 | Y3($2^{-9}$~$2^{-16}$) | 3 |  |
|  | 9 | Y5($2^{-1}$~$2^{-7}$) | 4 |  |
|  | 10 | Y5($2^{-9}$~$2^{-16}$) | 3 |  |
|  | 11 | Y7($2^{-1}$~$2^{-7}$) | 4 |  |
|  | 12 | Y7($2^{-9}$~$2^{-16}$) | 3 |  |

As stated above, the present invention is characterized in that it is not necessary to temporarily store some intermediate values and repetitively access registers. Each circuit system 28 needs only a shift register 36. Registers for storing intermediate values can be greatly saved to reduce the hardware cost. As compared to the prior art, the video coding circuit system of the present invention can reduce 34% of the area cost, and 39% of the amount of registers can be saved. The reduced area can further decrease the switching capacitance of the circuit to lower down the power consumption. In the amount of calculation, the video coding method of the present invention saves 48% of the clock periods as compared to the prior art. Therefore, a relatively higher throughput rate can be obtained to reduce the calculation time and the power consumption. The present invention is even more suitable to high-end multimedia video coding applications.

Moreover, the present invention provides a dynamic guarded computation method to reduce the power consumption. Because the differences between two adjacent frames are usually encoded during video coding, it is most likely that only the least significant part of the input data of the transform coding expression is used. When the arithmetic data in the circuit system does not use all the bandwidth, the part of circuit not affecting the arithmetic result can be turned off to save the power consumption. In the dynamic guarded computation method proposed by the present invention, a detection logic circuit is used to automatically detect the least number of bits that are required by the arithmetic circuit and then dynamically determine how much data bandwidth is required for usage. Next, a control circuit is used to turn off the part of circuit that is not required according to the detection result. The part of circuit that is selectively turned off can be 4-bit, 8-bit or 12-bit, or every bit can be separately turned on or off. When the circuit is partitioned thinner, the dynamic guarded computation method can save more data switching activities, but the power consumption caused by the detection logic circuit and the data I/O controller will also be larger.

Figure 6:
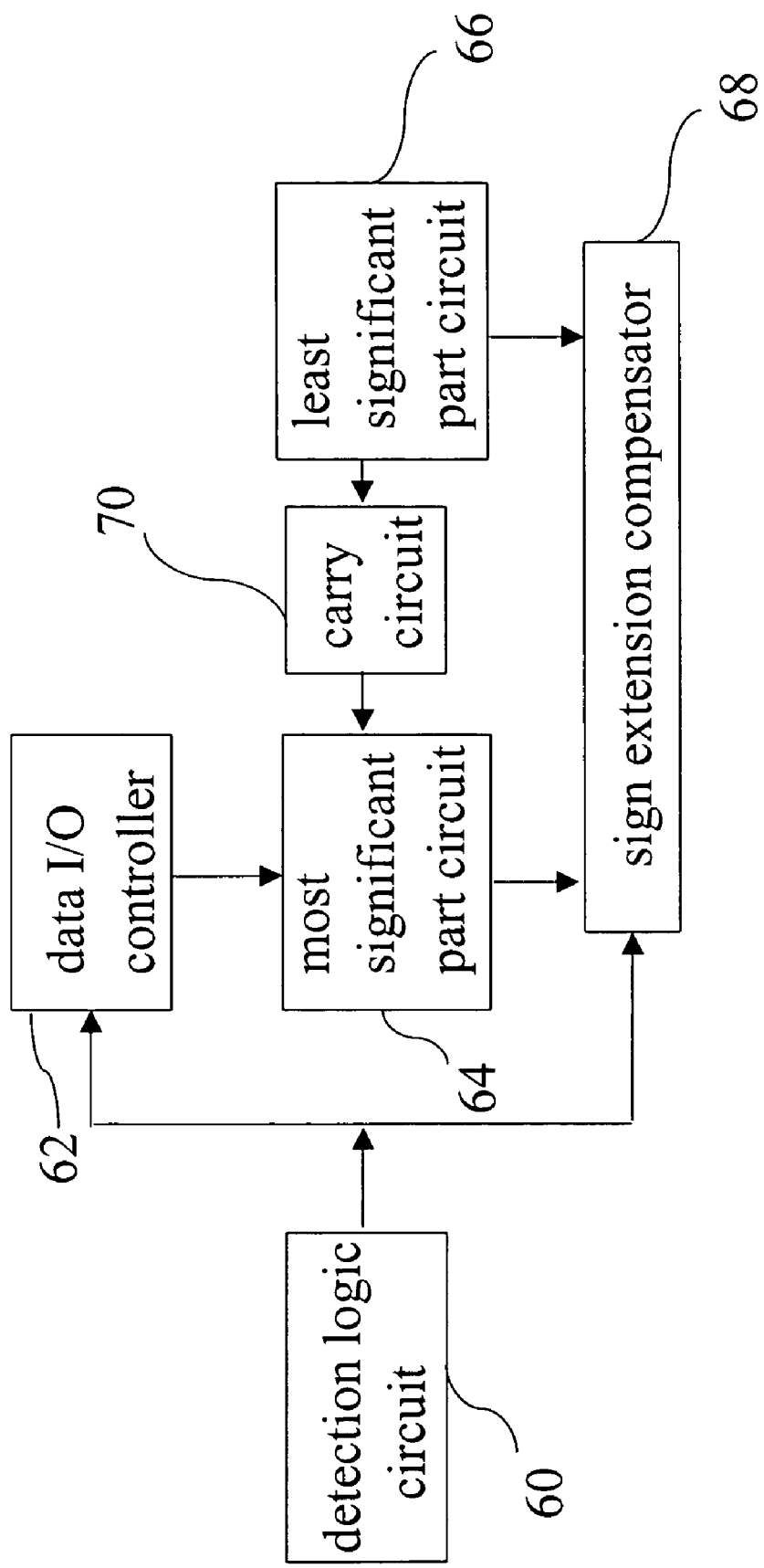
FIG. 6 is a diagram of a dynamic guarded computation circuit according to an embodiment of the present invention.
Figure 7:
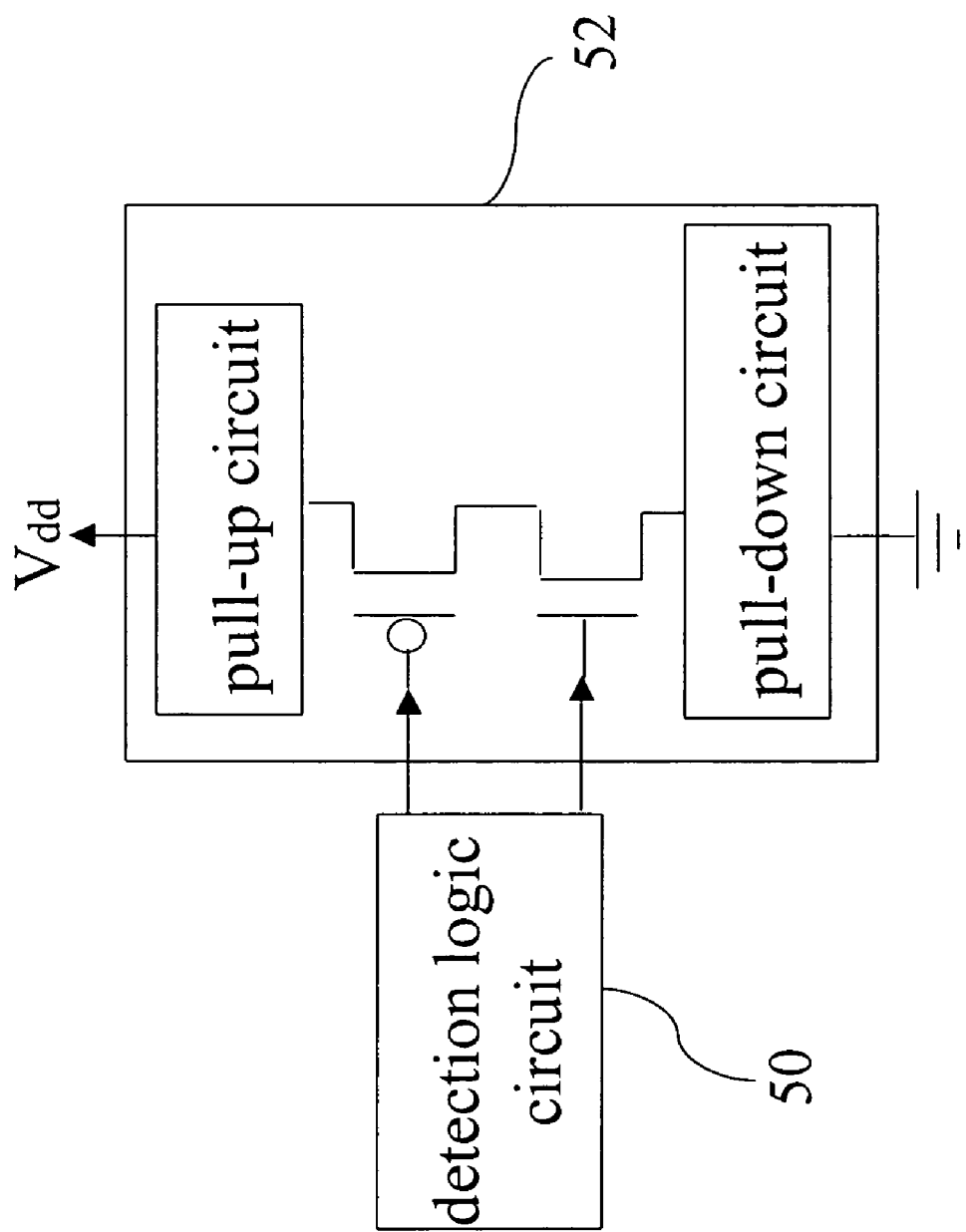
FIG. 7 is a structure diagram showing how the data I/O controller of the dynamic guarded computation circuit uses a clocked CMOS to realize the control circuit of the present invention.
Figure 8:
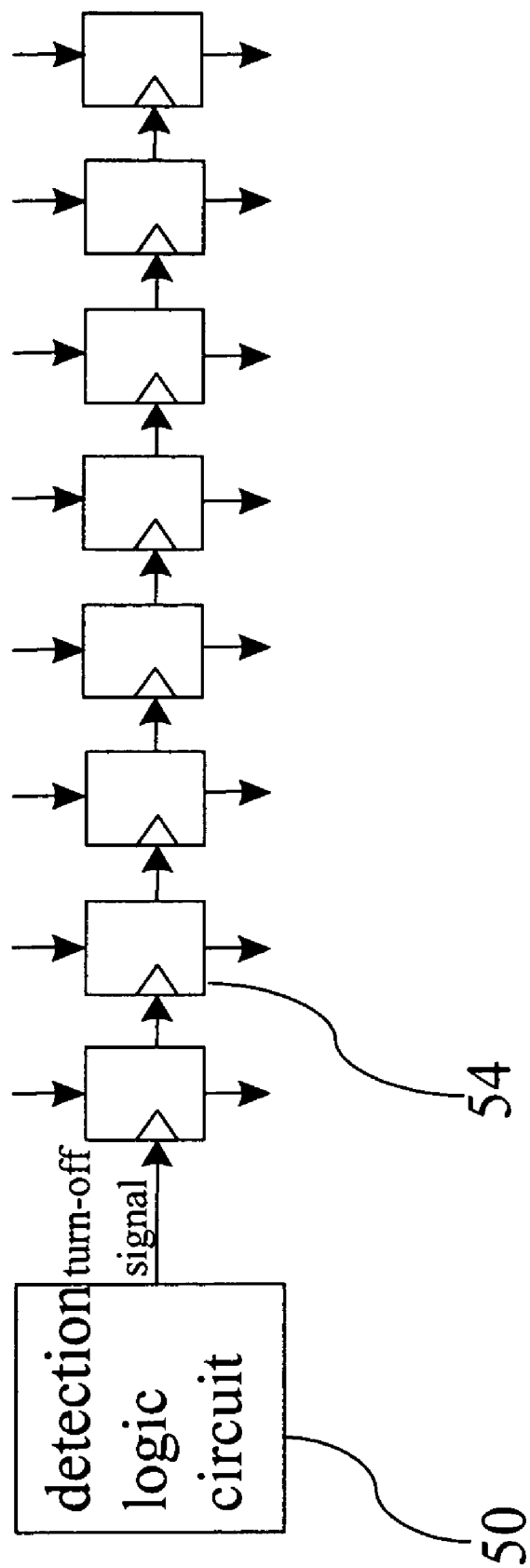
FIG. 8 is a diagram of the data I/O controller of the dynamic guarded computation circuit according to another embodiment of the present invention.
Figure 9:
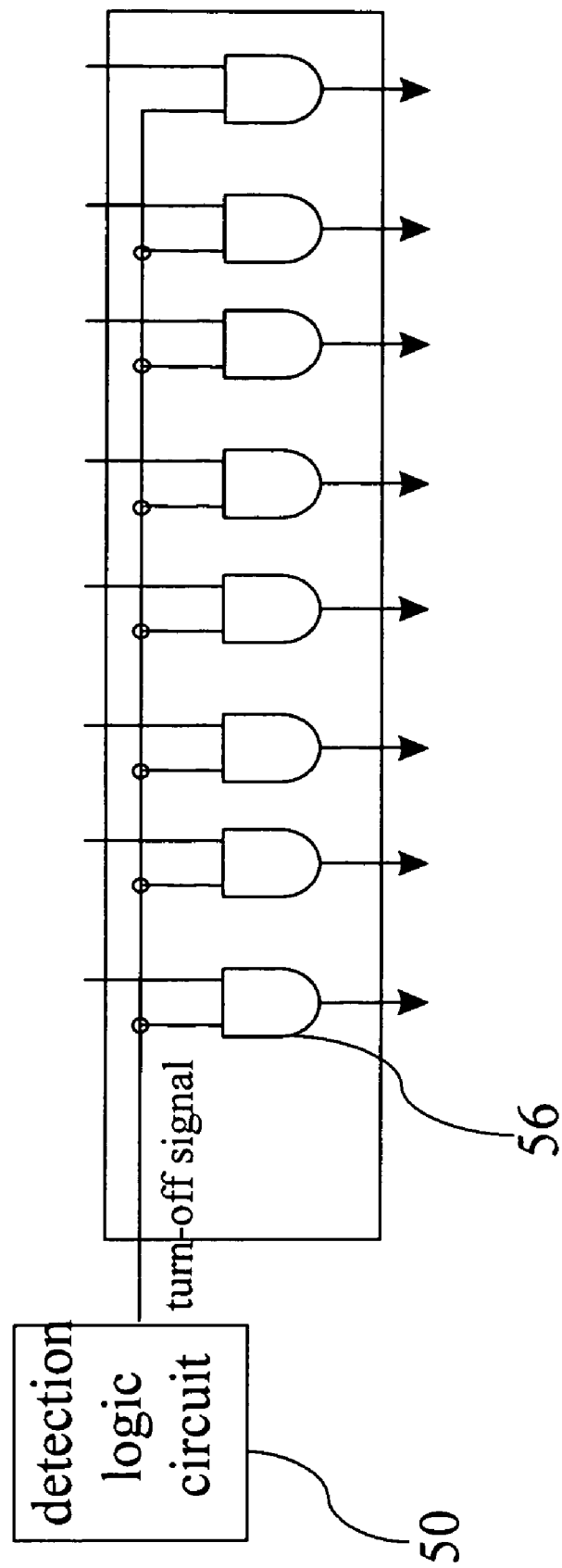
FIG. 9 is a diagram of the data I/O controller of the dynamic guarded computation circuit according to another embodiment of the present invention.
Figure 10:
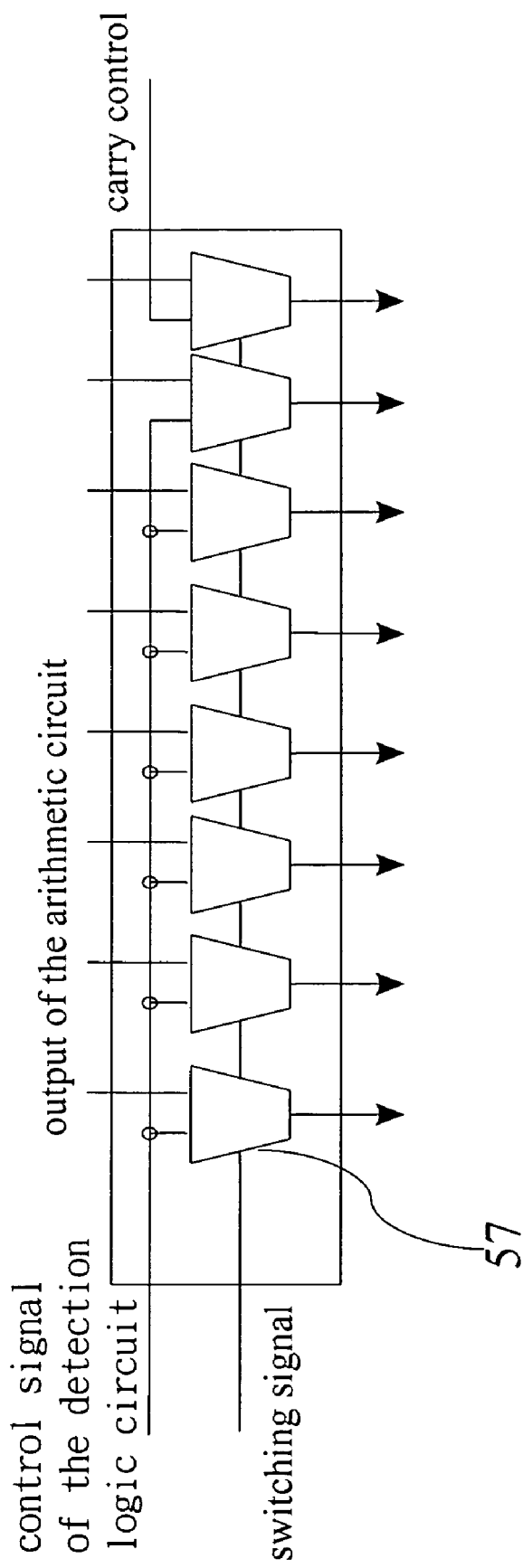
FIG. 10 is a diagram of the sign extension compensator of the dynamic guarded computation circuit according to an embodiment of the present invention.
Figure 11:
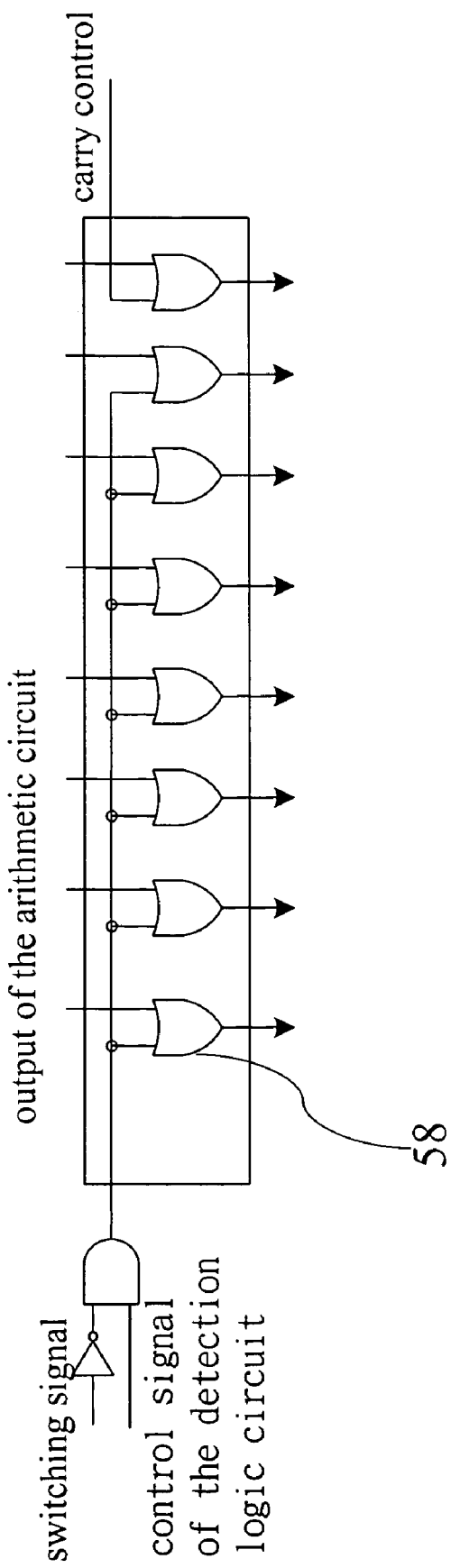
FIG. 11 is a diagram of the sign extension compensator of the dynamic guarded computation circuit according to another embodiment of the present invention.
Figure 12:
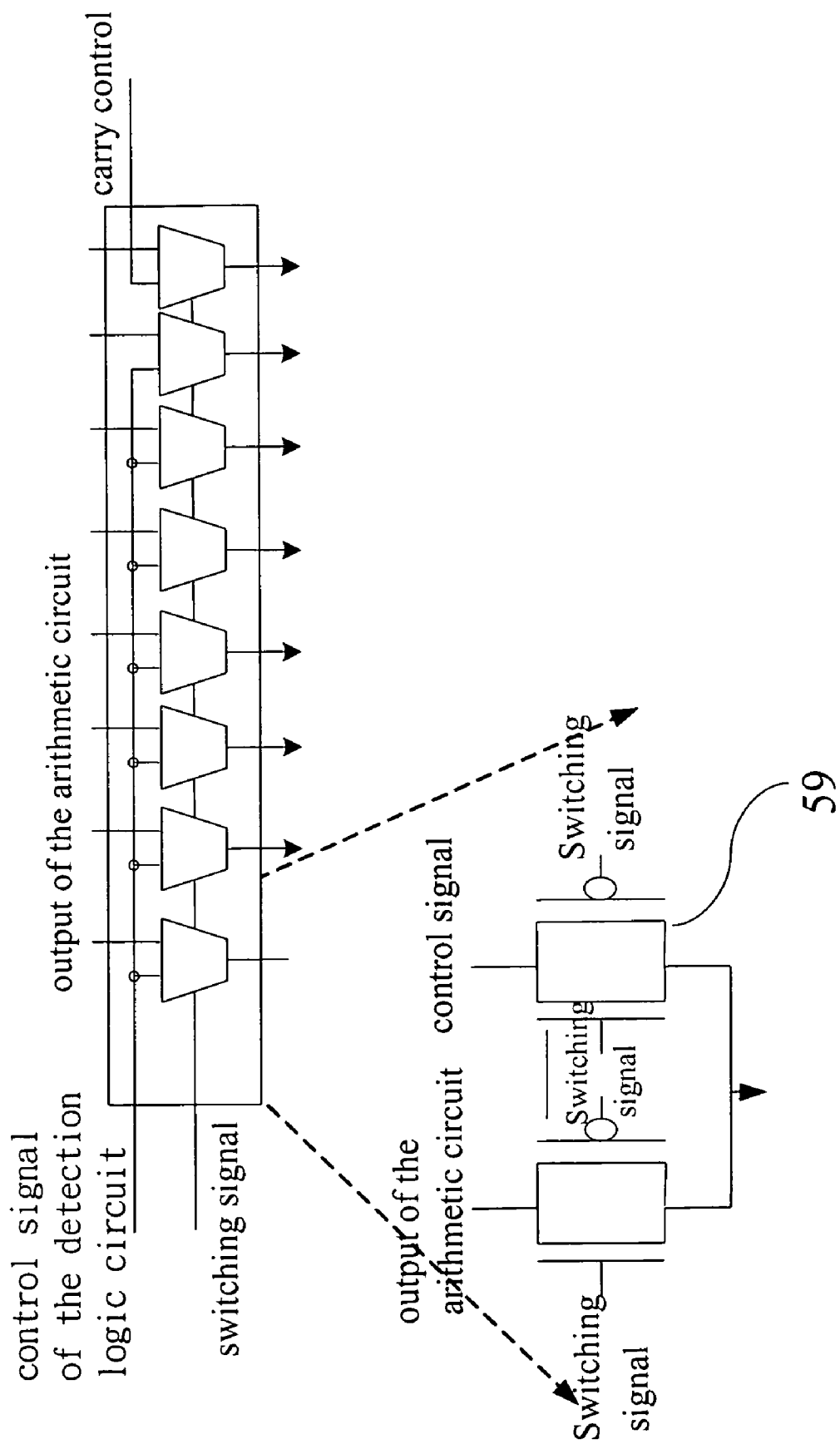
FIG. 12 is a diagram of the sign extension compensator of the dynamic guarded computation circuit according to another embodiment of the present invention.

FIG. 6 is a diagram of a dynamic guarded computation circuit according to an embodiment of the present invention. The arithmetic circuit is divided into a least significant part circuit 66 and a most significant part circuit 64. A carry circuit 70 for processing carry is provided between the least significant part circuit 66 and the most significant part circuit 64. When a detection logic circuit 60 determines that the input data entering the most significant part circuit will not affect the final arithmetic result, a data I/O controller 62 will turn off the input of the most significant part circuit 64 to deactivate its action, and a sign extension compensator 68 is used to compensate the correct sign output. The power consumption of the most significant part circuit in the adder/subtractors can thus be saved. FIG. 7 is a diagram of the data I/O controller according to an embodiment of the present invention. A clocked CMOS is used as a control circuit 52. A pair of PMOS and NMOS controlled by the detection logic circuit 50 is used as a switch of local circuit and is cascaded between a pull-up circuit and a pull-down circuit. FIG. 8 and FIG. 9 are diagrams of the control circuit according to two other embodiments. In FIG. 8, the control circuit is composed of at least a register 54. In FIG. 9, the control circuit is composed of at least an AND-gate 56. The sign extension compensator 68 can be composed of at least a multiplexer, or can be a gate circuit, or can be composed of at least a complementary pass-transistor logic. FIG. 10 shows an embodiment of the sign extension compensator, which is composed of multiplexers 57. Its output source can be selected between the output of the arithmetic circuit and the control signal provided by the detection logic circuit 50 for sign extension compensation. FIG. 11 and FIG. 12 show two other embodiments of the sign extension compensator. In FIG. 11, the sign extension compensator is composed of OR-gates 58. In FIG. 12, the sign extension compensator is composed of complementary pass-transistor logics 59.

The dynamic guarded computation method of the present invention makes good use of the correlation in video data, automatically detects the least number of bits that are required for arithmetic operation, and turns off the part of circuit not affecting the arithmetic result according to the detection result, thereby effectively saving the power consumption of the circuit which makes the video coding circuit system achieve the objects of low power and high efficiency.

Figure 13:
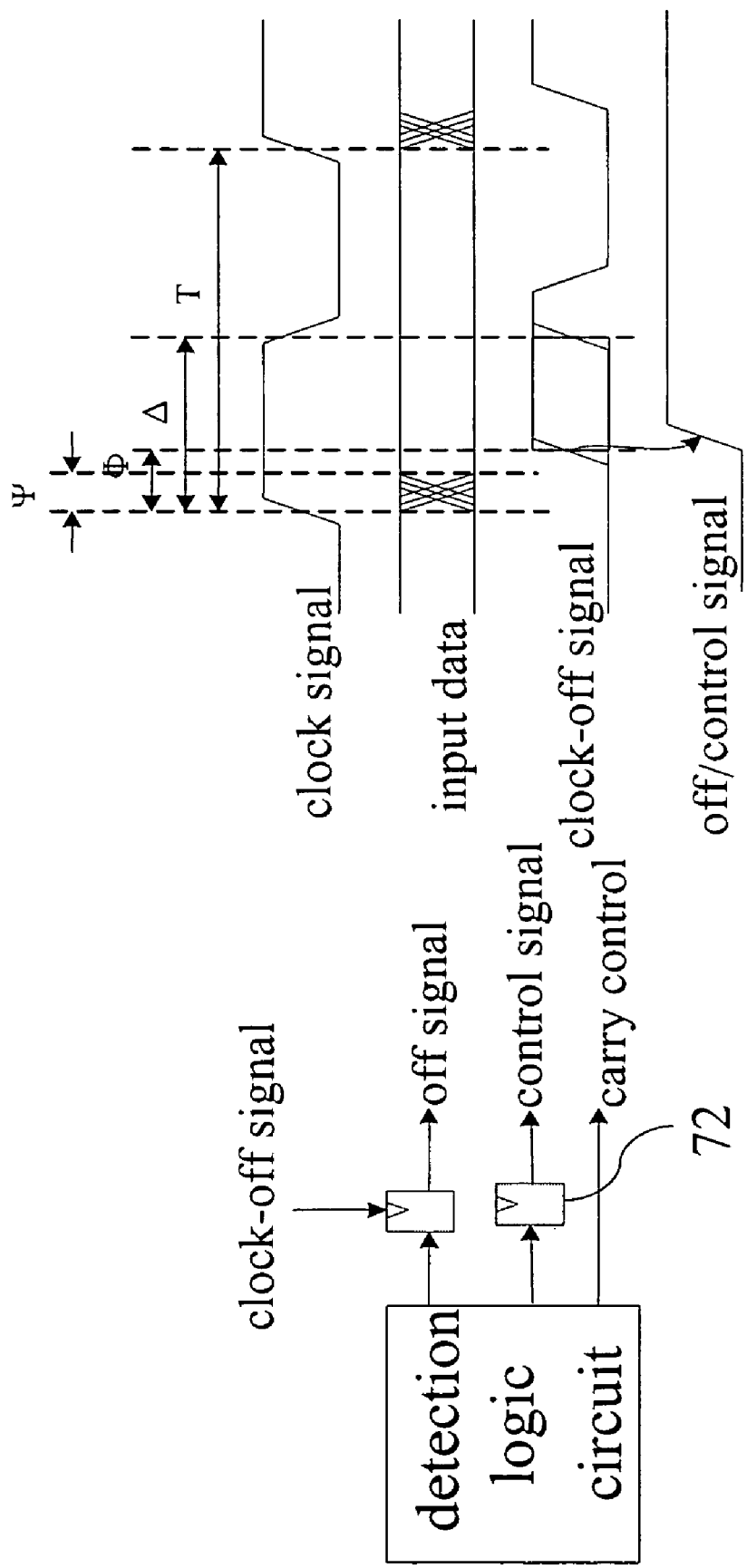
FIG. 13 is a diagram of the switching power suppression circuit according to an embodiment of the present invention.

To further lower down the power consumption of the arithmetic circuit, the present invention provides a switching power suppression technique to control the time when the input data enter the arithmetic circuit. In this technique, the input data enter the arithmetic circuit after achieving stable to avoid switching power consumption caused by transient state. FIG. 13 is a diagram of the switching power suppression circuit according to an embodiment of the present invention. A signal assertion control circuit composed of registers 72 is added at the output end of the detection logic circuit. The function of the signal assertion control circuit is to delay the time when the data enter the circuit, and to let the data signal enter the arithmetic circuit after achieving stable. Data not achieving stable yet will not affect the rear-stage circuits. Through excluding transient data signal, unnecessary switching power consumption can be eliminated.

To sum up, the video coding method of the present invention combines a transform coding method capable of enhancing the data throughput rate and shrinking the area cost, and a dynamic guarded computation method and a switching power suppression technique both capable of effectively reducing power consumption to achieve the advantages of high efficiency, low cost and low power. The present invention also proposes circuit designs that realize the above video coding methods, wherein several parallel circuit systems are used to speed up the operation of the transform coding expression. The present invention thus is highly expandable and scalable in architectural view point, and can be applied to various different video systems.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A method for versatile and scalable video coding comprising the steps of:
    (a) expressing coefficients of a transform coding expression with a digit system;
    (b) taking apart an inner product expression of said expression into a series of add and shift operations;
    (c) partitioning said expression into several sub-expressions;
    (d) using several adders/subtractors circuit and a shift accumulator to carry out corresponding additions/subtractions and shift operations to input data with each order of said series as a clock period;
    (e) repeating said step (d) and accumulating the operation result of each order with said shift accumulator until finishing said series and all said sub-expressions, and using the final accumulated value as the output data; and
    (f) performing a dynamic guarded computation, whereby a detection signal detects the number of bits required for operation so as to dynamically determine how much data bandwidth is to be used and turn off the portion of circuit that is not required for usage.

2. The method as claimed in claim 1, wherein said transform coding expression can be a 1D or a 2D expression.

3. The method as claimed in claim 2, wherein said transform coding expression is a discrete cosine transform, an integer transform coding, or a Hadamard transform.

4. The method as claimed in claim 1, wherein said coefficients can be expressed with canonical signed digits after expressed with a digit system.

5. The method as claimed in claim 1, wherein said coefficients can be multiplied by $\sqrt{6}$ to reduce the amount of calculation after expressed with a digit system.

6. The method as claimed in claim 1, wherein the simplified inner product in said step (b) is carried out by an adder-based distributed arithmetic algorithm.

7. The method as claimed in claim 6, wherein the expression of adder-based distributed arithmetic is:

$$Yn = \sum_{i=0}^{N-1} C_i \cdot X_i = \sum_{i=0}^{N-1} \left( \sum_{k=0}^{W_c-1} C_{i,k} \cdot 2^{-k} \right) \cdot X_i = \sum_{k=0}^{W_c-1} \left( \sum_{i=0}^{N-1} C_{i,k} \cdot X_i \right) \cdot 2^{-k},$$

where N is the order of said inner product operation, $X_i$ is the input data, $W_c$ is the word length of $C_i$, $C_{i,k}$ is the k-th bit of $C_i$, and $Y_n$ is the output data.

8. The method as claimed in claim 1, wherein the partition of said expression can make each said sub-expression have a close amount of computations.

9. The method as claimed in claim 1, wherein a zero-padding step can be performed to enhance the accuracy before entering said shift accumulator in said step (d).

10. The method as claimed in claim 1, wherein said input data can be separately enabled.

11. The method as claimed in claim 1, wherein input data of different orders can be shifted to the same order for combined calculation to reduce the number of said clock period.

12. The method as claimed in claim 1 further comprising a step of collecting the output data of said sub-expressions using a register.

13. The method as claimed in claim 1, wherein the number of bits that is selectively turned off can be 4-bit, 8-bit or 12-bit.

14. The method as claimed in claim 1, wherein all said number of bits can be individually turned on or off.

15. The method as claimed in claim 1, wherein a sign extension compensator directly compensates the output of said part of circuit that is turned off to save the power consumption.

16. The method as claimed in claim 1 further comprising a switching power suppression procedure, wherein the time for performing said additions/subtractions and shift operations to said input data is controlled, and said additions/subtractions and shift operation are carried out after said input data achieves stable to avoid switching power consumption caused by transient state.

17. The method as claimed in claim 16, wherein said switching power suppression procedure controls the rise and drop time of signal at the output end of said detection logic circuit to eliminate switching power consumption.

18. A dynamic guarded computation method used in video coding, said method using a detection signal to detect the required number of bits for operation of a transform coding expression, the inner product operation of said transform coding expression being taken apart into add and shift operations, adder/subtractors circuit and a shift accumulator being used to perform said corresponding additions/subtractions and shift operations, said dynamic guarded computation method being able to dynamically determine how much data bandwidth is required for usage and turn off a part of said adder/subtractors circuit that are not required for usage, a sign extension compensator directly compensating the output of said part of adders/subtractors circuit that is turned off, each said bit being able to be selectively turned on or off.

19. A method for versatile and scalable video coding comprising the steps of:
 (a) expressing coefficients of a transform coding expression with a digit system;
 (b) taking apart an inner product expression of said expression into a series of add and shift operations;
 (c) partitioning said expression into several sub-expressions;
 (d) using several adders/subtractors circuit and a shift accumulator to carry out corresponding additions/subtractions and shift operations to input data with each order of said series as a clock period;
 (e) repeating said step (d) and accumulating the operation result of each order with said shift accumulator until finishing said series and all said sub-expressions, and using the final accumulated value as the output data; and
 (f) performing a dynamic guarded computation, wherein a detection signal is used to detect the number of bits required for operation so as to dynamically determine how much data bandwidth should be used and turn off the part of circuit that is not required for usage whereby the time for performing additions/subtractions corresponding to said transform coding expression to input data of video coding is controlled, and said additions/subtractions are carried out after said input data achieves stability in order to avoid switching power consumption caused by transient state.

20. A circuit system for versatile and scalable video coding whose input data is a transform coding expression, the inner product operation of said transform coding expression being taken apart into add and shift operations, said transform coding expression being partitioned into several sub-expressions, several parallel circuit systems being used to finish said sub-expressions simultaneously to enhance the throughput rate, said circuit system comprising:
 at least an adder/subtractor circuit for performing said additions/subtractions to said input data;
 a shift register connected to said adder/subtractor circuit to perform said shift operations to said input data and accumulate each operation and a dynamic guarded computation circuit, wherein said dynamic guarded computation circuit comprises a detection logic circuit and a control circuit, said detection logic circuit is used to detect the number of bits required for operation and dynamically determine how much data bandwidth is required for usage, and said control circuit is used to turn off which part of said adder/subtractor circuit not required for usage.

21. The circuit system as claimed in claim 20, wherein said shift accumulator comprises an adder for accumulating each said operation result and a shift register, which is connected to said adder and used for performing said shift operations and temporarily storing said operation result.

22. The circuit system as claimed in claim 20 further comprising several multiplexers, wherein each said multiplexer has a plurality of inputs and at least an output, and one of said inputs is selected to said adder/subtractor circuit connected to said output.

23. The circuit system as claimed in claim 20, wherein said transform coding expression can be a 1D expression or a 2D expression.

24. The circuit system as claimed in claim 23, wherein said transform coding expression is a discrete cosine transform, an integer transform coding, or a Hadamard transform.

25. The circuit system as claimed in claim 20 further comprising a zero padder, wherein said zero padder is located in front of said shift accumulator and used for performing zero-padding to data input to said shift accumulator.

26. The circuit system as claimed in claim 20, wherein said input data can be separately enabled.

27. The circuit system as claimed in claim 20, wherein output ends of several parallel circuit systems corresponding to said sub-expressions can be connected to a register to collect output data of said sub-expressions.

28. The circuit system as claimed in claim 20, wherein said part of circuit that is selectively turned off can be 4-bit, 8-bit or 12-bit.

29. The circuit system as claimed in claim 20, wherein each said bit can be individually turned on or off.

30. The circuit system as claimed in claim 20, wherein said control circuit is a clocked-CMOS circuit, which uses a pair of PMOS and NMOS controlled by said detection logic circuit as a switch and is cascaded between a pull-up circuit and a pull-down circuit.

31. The circuit system as claimed in claim 20, wherein said control circuit is composed of at least a register.

32. The circuit system as claimed in claim 20, wherein said control circuit is composed of at least an AND-gate.

33. The circuit system as claimed in claim 20 further comprising a sign extension compensator, wherein said sign extension compensator is controlled by said detection logic circuit to compensate the output of said part of circuit that is turned off.

34. The circuit system as claimed in claim 20, wherein said part of circuit is a most significant part circuit.

35. The circuit system as claimed in claim 34 further comprising a circuit for processing the carry between a least significant part circuit and said most significant part circuit.

36. The circuit system as claimed in claim 20 further comprising several data I/O controllers for controlling data input of said part of circuit that is not required for usage.

37. The circuit system as claimed in claim 20 further comprising a circuit for controlling the rise and drop of signal, wherein said circuit is connected to the output of said detection logic circuit to control the time when said input data enter said adder/subtractor circuit, thereby eliminating switching power consumption.

38. The circuit system as claimed in claim 37, wherein said circuit for controlling the rise and drop of signal can be composed of registers.

39. The circuit system as claimed in claim 33, wherein said sign extension compensator is composed of at least a multiplexer.

40. The circuit system as claimed in claim 33, wherein said sign extension compensator is composed of at least an OR-gate.

41. The circuit system as claimed in claim 33, wherein said sign extension compensator is composed of at least a complementary pass-transistor logic.

* * * * *